United States Patent [19]
Jacquelin

[11] 3,787,276
[45] Jan. 22, 1974

[54] CORRUGATED CARDBOARD CONTAINING SULPHUR FOAM

[76] Inventor: Guy J. Jacquelin, Boulevard du Marechal Joffre, 38 Grenoble, France

[22] Filed: Apr. 12, 1971

[21] Appl. No.: 133,016

[30] Foreign Application Priority Data
Apr. 13, 1970 France.............................. 7013233

[52] U.S. Cl.................... 161/137, 156/78, 156/205, 156/210, 156/293, 161/127, 161/159, 264/45
[51] Int. Cl............................ B32b 1/00, B32b 3/28
[58] Field of Search.................... 161/133, 135, 137, 161/127, 159–161; 156/78, 79, 210, 205, 293; 264/45; 260/2.5

[56] References Cited
UNITED STATES PATENTS
813,323   2/1906   Rivers............................. 161/108 X
3,183,143   5/1965   Harris.............................. 156/296 X
3,497,409   2/1970   Clem................................... 156/213

Primary Examiner—William A. Powell
Attorney—Ward, McElhannon, Brooks & Fitzpatrick

[57] ABSTRACT

This invention relates to a new elementary material which is a corrugated cardboard comprising a corrugated sheet, made of cellulosic material, with parallel corrugations, covered with at least one coating sheet and in which at least a part of the space between a face of said corrugated sheet and the corresponding coating sheet comprises a sulphur foam. The invention also relates to a process of manufacturing the above-defined material.

2 Claims, 4 Drawing Figures

CORRUGATED CARDBOARD CONTAINING SULPHUR FOAM

The present invention relates to a new corrugated cardboard containing sulphur foam, and process for its manufacture.

U.S. Pat. No. 2,973,295 discloses a composite material comprising a corrugated cardboard whose corrugations contain an expanded material which is polyurethane. The composite material thus obtained has a certain number of improved properties, with respect to the corresponding cardboard without polyurethane, in particular a better resistance to humidity and an increase in its resistance to crushing. In such a composite material, it could be thought to replace the polyurethane foams by other foams of plastics material such as phenolic foams, polystyrene foams or polyolefin foams, but, in the same way as for the polyurethane, it has been found that it was difficult to place said foams in position and the improvements in the properties of the composite cardboard thus obtained did not justify the experimental complications met with and the costs involved in making said composite materials.

It has now been found that the use of sulphur foams for filling, at least in part, the corrugations of a corrugated cardboard enabled, after the material obtained was covered with at least one coating sheet, an elementary material to be obtained having exceptional properties and being very easy to manufacture industrially.

The present invention therefore relates, as new elementary material, to a corrugated cardboard comprising a corrugated sheet with parallel corrugations covered with at least one coating sheet and in which at least a part of the space between the corrugated sheet and a coating sheet comprises a sulphur foam.

Sulphur foam is a material which has been known for several years and is a material of amorphous structure prepared by extrusion, at a temperature of 110°C, of a mixture comprising sulphur, a plasticizer, various stabilizers, and at least one expansion agent. This material is therefore directly deposited on at least one constituent element of the corrugated cardboard, in the form of foam, this corresponding to a very simple operation, since no chemical reaction and no "foaming" occur after this material has been placed in position. What enables materials according to the invention to be made is in particular the extremely high adhesive power of said foam compared with the cellulosic elements which constitute the cardboard. Such a property, which is essential for obtaining a final product having high characteristics, is surprising in view of the amorphous structure of the foam and a certain chemical inertia of this material.

This very high adhesive power of the foam has in addition an important consequence which is to ensure the adherence of the corrugated sheet to the coating sheet without needing another adhesive. This property therefore further simplifies to a great extent the industrial production of the finished product.

Furthermore, the sulphur foam is a thermoplastics material; it may undergo the phenomenon of melting or softening and returning to its original state, this giving the product according to the invention the noteworthy property of being able to be shaped hot (for example by using a press) and of reassuming all its properties after cooling.

Thus the product according to the present invention may be shaped in two ways:
- as indicated hereinabove by softening the product by heating and by pressing said latter;
- or, cold, by folding along the corrugations, this technique being possible as the sulphur foam is disposed only on one face of the corrugated sheet.

Finally, it may be noted that the rigidity of the product according to the invention is very high and this rigidity is maintained in a humid atmosphere; such a property opens up fields of application to this product which were not possible with the known corrugated cardboards.

It is obviously possible to make new complex products from the new elementary material according to the present invention; thus a plurality of novel corrugated cardboards whose corrugations may or may not be parallel, may be glued together; particularly resistant structures are thus made which may be used in the building industry; there may also be associated with the elementary material other materials which may be fixed to a sheet of cellulosic material such as for example plaster, ordinary paper and cardboard, etc.

The invention will be described in greater detail with reference to the accompanying drawings, in which.

Figure 1:
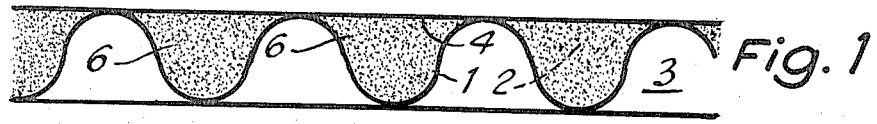
FIG. 1 is a transverse section showing a first embodiment of the corrugated cardboard according to the invention.
Figure 2:
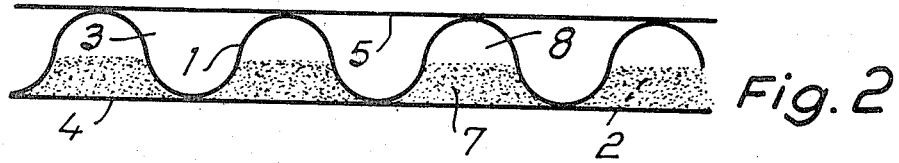
FIG. 2 is another transverse section illustrating a second embodiment of this corrugated cardboard.

Referring now to the drawings, FIGS. 1 and 2 show the corrugated cardboard which comprises, in a manner known per se, on the one hand a corrugated sheet 1 delimiting on one face corrugations 2 and on the opposite face corrugations 3, on the other hand, a flat coating sheet 4 applied to the peaks of the corresponding corrugations 2, The sheets 1 and 2 are based on paper fibers and although they may comprise other elements and/or products, they are sometimes designated hereinafter as cellulosic sheets or supports.

In addition, the assembly 1–4 may constitute all or part of the cardboard, as far as the laminate structure is concerned. In fact, the cardboard may comprise only the sheets 1 and 4, or these sheets 1 and 4 with another coating sheet 5 applied to the peaks of the corrugations (FIGS. 1 and 2), or at least two corrugated sheets between which is disposed a flat interpolated sheet applied to the peaks of the adjacent corrugations and on all of which are placed coating sheets 4 and 5, these corrugated sheets having corrugations of the same modulus or of different moduli.

In order to simplify the description, the means used for carrying out the invention are described hereinafter with reference only to the laminate structure shown in FIGS. 1 and 2, but it is obvious that they are applicable to the other structures mentioned hereinabove.

According to the embodiment shown in FIG. 1, strands of rigid foam 6 fill all the corrugations of the corrugated sheet 1 and adhere to the walls of these latter as well as to the coating sheet 4, thus ensuring the integration of said sheets and the rigidification of the structure 1 – 4.

According to the embodiment illustrated in FIG. 2, strands of rigid foam 7 fill only part of the corrugations 2 of the corrugated sheet and leave empty channels 8 in the hollows of these corrugations. The strands 7 adhere, as before, to the walls of said corrugations, but near their peak, and to the coating sheet 4, and ensure the integration of the sheets 1 and 4 and the rigidification of the structure.

Whatever the embodiment chosen, it is ascertained that all the corrugations 2 contain a strand of foam 6 or 7, but that on the contrary all the corrugations 3 remain empty. Thanks to this, the cardboard, whilst being rigid, is pliable at right angles to the corrugations 3 in their direction.

It is obvious that strands of foam 6 or 7 may be present in certain of the corrugations 2 and in certain of the corrugations 3 as soon as there are regularly distributed, empty corrugations 2 and/or 3. Thus the cardboard retains its property of foldability and the possibility of regulating its rigidity by altering not only the section of the strands of foam but also their distribution. For example, groups of at least two corrugations 2 may be provided, with strands 6 or 7 separated by at least one corrugation 2 without strand and the same distribution for the corrugations 3 so that the empty corrugations 2 or 3 are separated from one another — or a corrugation 2 may be provided, with one strand separated from the following by at least two empty corrugations 2 and similarly for corrugations 3, provided that the corrugations 2 and 3 with strands are arranged in fives.

The distribution of the strands in the corrugations of at least two corrugated sheets 1 follows the same rule according to which there are empty corrugations over the whole thickness of the cardboard.

Figure 3:
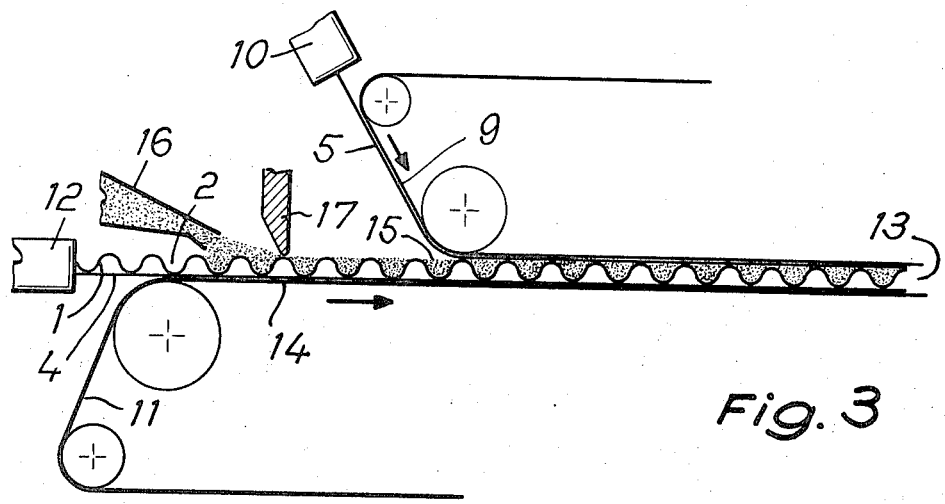
FIG. 3 is a very schematic view showing a first mode of execution of a machine for manufacturing the corrugated cardboard according to the invention.

For manufacturing the cardboard according to FIG. 1, the machine shown diagrammatically in FIG. 3 may be used.

This machine comprises a first conveyer belt 9 cooperating with a dispenser 10 for dispensing a continuous coating sheet 5. It also comprises a second conveyer belt 11 cooperating with a dispenser 12 for dispensing a continuous corrugated sheet 1 which is possibly unitary, by its peaks, with a continuous coating sheet 4. The belts 9 and 11 define between themselves, over part of their path, a passage 13 in which the sheet 5 is guided on the corrugated sheet 1 and all the sheets are pressed sufficiently to permit integration. The conveyer belt 11 is located underneath and has an elongation 14 extending in front of the entrance 15 of the passage 13 so as to form a work table.

A nozzle 16 is disposed above this table and is connected to a foam making apparatus; the nozzle is parallel to the elongation 14 and forms an angle, preferably a right-angle, with the axis of advance movement of the belt; it tips the foam onto the corrugated sheet 1, which foam slightly overfills the corrugations 2. In addition, a levelling device is mounted on the frame of the machine between the nozzle 16 and the entrance 15 of the passage; this device is preferably constituted by a scraper blade 17 whose lower edge levels off the foam to the peaks of the corrugations 2.

After passage beneath the nozzle 16 then the scraper blade 17, the corrugations 2 of the corrugated sheet 1 are thus all filled, to the level of the peaks, with a foam in the plastics state, i.e., not yet rigidified. In the passage 13, the coating sheet 5 is applied to the corrugated sheet 1 and the foam, in the same way as it adhered as soon as it was deposited on this latter, adheres to this coating sheet as soon as it is applied. By becoming firm upon leaving the passage 13, the foam consequently ensures the rigidification of the cardboard and the definite bonding of its constituent sheets.

Figure 4:
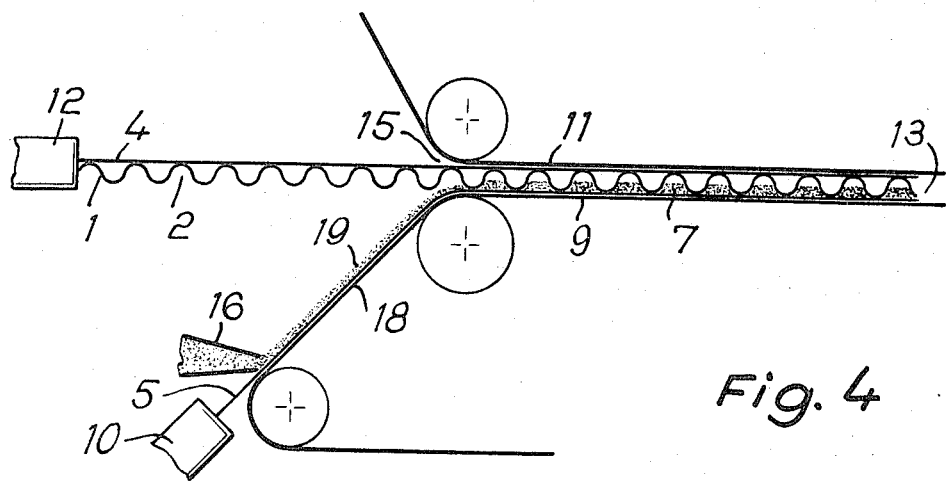
FIG. 4 is a view similar to that of FIG. 3, showing a second mode of execution of a machine for manufacturing the corrugated cardboards according to the invention.

In order to manufacture the cardboard according to FIG. 2, the machine shown schematically in FIG. 4 may be used.

In this second embodiment of the machine, the conveyer bolts 9 and 11 define the passage 13 and cooperate with the dispensers 10 and 12 respectively dispensing a coating sheet 5 and at least one corrugated sheet 1, as well as the nozzle 16 for supplying foam. However, in this case, the conveyer 11 is located above ahe conveyer 9 and it is the latter which is provided with an elongation 18 forming a work table. Moreover, the nozzle 16 is located above this elongation in order to tip the foam not into the corrugations 2, but on the coating sheet 5 and in a uniform layer 19.

The conveyors by applying the sheet 5 against the peaks of the corrugations 2 of the corrugated sheet 1 at the entrance of the passage 15, transform the distribution of the foam which, already being present on the sheet 5 in a continuous layer 19 of constant thickness, flows only into the corrugations 2 and thus forms strands 7. The thickness of the strands is obviously larger than the thickness of this layer 19, but said latter is determined so that said strands fill only the desired part of the corrugations.

As before, the foam ensures the rigidification of the cardboard and the definite bonding of its constituent sheets, by becoming firm upon leaving the passage 13.

An elementary material as shown in FIG. 1 is made by using a corrugated sheet, the depth of corrugations of which is 4 mm; there is deposited on this sheet, preheated to 70°C, a sulphur foam of density 500 kg/m$^3$ then a coating sheet; another coating sheet is glued to the other part of the corrugated sheet.

After cooling, the material thus obtained has resisted a weight of 1,250 kg applied to the standard testbar; if the same test is carried out on the same cardboard which does not contain any sulphur foam, said cardboard collapses at a weight of 200 kg.

What I claim is :

1. New elementary material which is a corrugated cardboard comprising a corrugated sheet, made of cellulosic material, with parallel corrugations, covered with at least one coating sheet and in which at least a part of the space between a face of said corrugated sheet and the corresponding coating sheet comprises a sulphur foam.

2. Complex materials comprising at least one elementary material according to claim 1, associated with the materials chosen from paper, cardboard, packing and construction materials.

* * * * *